United States Patent
Maeshima

(10) Patent No.: US 10,198,090 B2
(45) Date of Patent: Feb. 5, 2019

(54) ELECTRONIC APPARATUS WITH TOUCH SCREEN, PEN FOR TOUCH SCREEN AND PEN RETENTION METHOD

(71) Applicant: KABUSHIKI KAISHA TOSHIBA, Minato-ku, Tokyo (JP)

(72) Inventor: Shogo Maeshima, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/279,206

(22) Filed: Sep. 28, 2016

(65) Prior Publication Data
US 2017/0097698 A1    Apr. 6, 2017

(30) Foreign Application Priority Data
Oct. 1, 2015   (JP) ................................. 2015-196021

(51) Int. Cl.
*G06F 1/16*   (2006.01)
*G06F 3/0354*   (2013.01)

(52) U.S. Cl.
CPC ........ *G06F 3/03545* (2013.01); *G06F 1/1607* (2013.01); *G06F 2200/1632* (2013.01)

(58) Field of Classification Search
CPC .............. G06F 3/03545; G06F 1/1607; G06F 2200/1632
See application file for complete search history.

(56) References Cited

U.S. PATENT DOCUMENTS

| | | | | |
|---|---|---|---|---|
| 6,535,718 B2* | 3/2003 | Harano | ................ | G06F 1/1616 343/702 |
| 7,154,486 B2* | 12/2006 | Wang | .................... | G06F 1/1616 345/179 |
| 2002/0013160 A1* | 1/2002 | Harano | ................ | G06F 1/1616 455/556.1 |
| 2003/0214801 A1* | 11/2003 | Wang | .................... | G06F 1/1616 361/814 |
| 2006/0094464 A1* | 5/2006 | Kyou | .................... | G06F 1/1626 455/556.1 |
| 2012/0127041 A1* | 5/2012 | Wang | .................... | H01Q 1/084 343/702 |
| 2012/0139879 A1* | 6/2012 | Kim | ........................ | G06F 3/044 345/179 |

(Continued)

FOREIGN PATENT DOCUMENTS

| | | |
|---|---|---|
| JP | 10-187327 | 7/1998 |
| JP | 2001-142625 | 5/2001 |
| KR | 100830218 B1 * | 5/2008 |

*Primary Examiner* — Patrick F Marinelli
(74) *Attorney, Agent, or Firm* — Rutan & Tucker, LLP

(57) ABSTRACT

According to one embodiment, an electronic apparatus includes a case, pen, and antenna. The case includes an input surface and a peripheral edge having an engagement aperture opened in a direction along the input surface. The pen is used for an input operation with respect to the input surface. The pen includes an insertion piece which is made of synthetic resin and is attachably and detachably engaged in the engagement aperture while the pen is arranged against to the peripheral edge. The antenna is disposed inside the peripheral edge to be adjacent to the insertion piece in a distance which is less than the size of the insertion piece in a transverse direction of the input surface.

2 Claims, 5 Drawing Sheets

(56) References Cited

U.S. PATENT DOCUMENTS

| | | | | |
|---|---|---|---|---|
| 2014/0029183 A1* | 1/2014 | Ashcraft | ............... | G06F 1/26 |
| | | | | 361/679.4 |
| 2014/0035887 A1* | 2/2014 | Kim | ............... | B43K 23/008 |
| | | | | 345/179 |
| 2014/0347814 A1* | 11/2014 | Zaloom | ............ | G06F 1/1626 |
| | | | | 361/679.56 |
| 2016/0291706 A1* | 10/2016 | Trutna | ............ | G06F 3/03545 |
| 2017/0083121 A1* | 3/2017 | Kang | ............ | G06F 3/03545 |
| 2017/0097698 A1* | 4/2017 | Maeshima | ........ | G06F 3/03545 |

\* cited by examiner

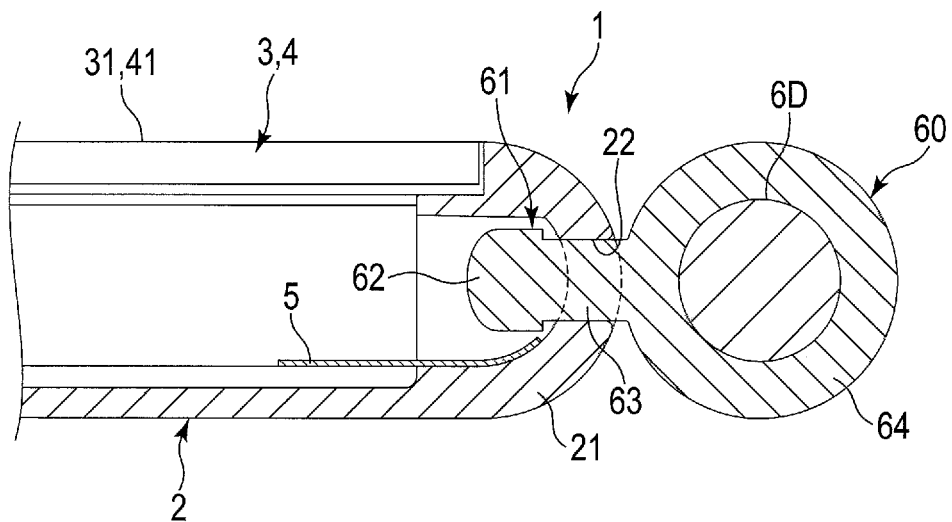
F I G. 4
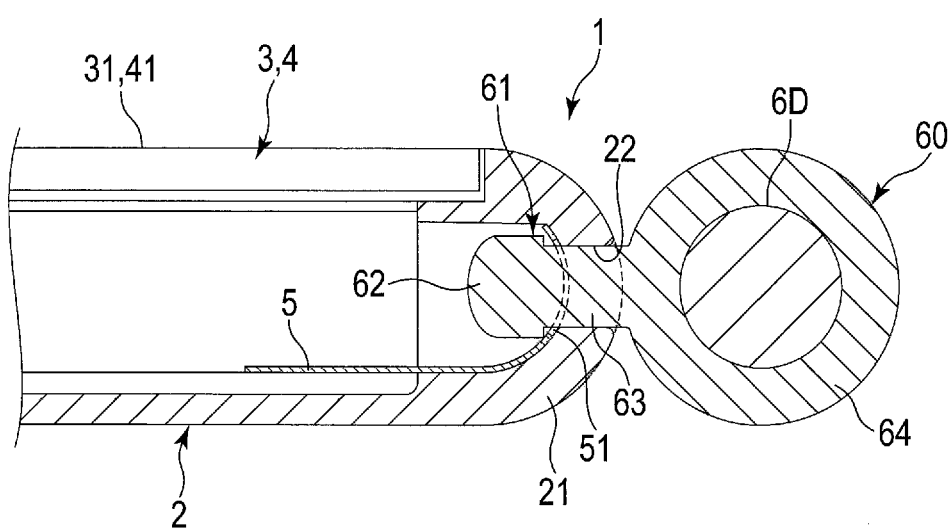
F I G. 5

(12) United States Patent

ELECTRONIC APPARATUS WITH TOUCH SCREEN, PEN FOR TOUCH SCREEN AND PEN RETENTION METHOD

CROSS-REFERENCE TO RELATED APPLICATIONS

This application is based upon and claims the benefit of priority from Japanese Patent Application No. 2015-196021, filed Oct. 1, 2015, the entire contents of which are incorporated herein by reference.

FIELD

Embodiments described herein relate generally to an electronic apparatus which can retain a pen for a touch screen operation.

BACKGROUND

There are pens used for data input on a touch screen and electronic apparatuses with a body which can accommodate such a pen without affecting the internal structure. The electronic apparatus includes a recess in a side of the body, to which may be attached an attachment member forming part of a pen-like accessory. An attachment aperture is formed at the bottom of the recess, and the attachment member includes an engaging part which may be detachably engaged in the attachment aperture.

Here, some of the styli for the touch screen operation have a conductive tip. In many electronic apparatuses, the internal structure of the case is packed very tightly to meet a need for high performance while allowing the device to be thin and light, and thus, an accommodation part provided specifically for the pen is difficult to achieve therein. Furthermore, the periphery of the case may include an antenna for wireless communication, and the pen including a conductive part should preferably be kept away from the proximity of the antenna.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is a cross-sectional view which shows the electronic apparatus and pen.

FIG. 5 is a cross-sectional view which shows an engagement part of an electronic apparatus and a pen of a second embodiment.

DETAILED DESCRIPTION

Various embodiments will be described hereinafter with reference to the accompanying drawings.

In general, according to one embodiment, in which, an electronic apparatus which can retain a pen for an input operation to an input device without affecting an antenna accommodated in a peripheral edge of a case, the pen, and a pen retention method are provided.

According to one embodiment, an electronic apparatus includes a case, pen, and antenna. The case includes an input surface and a peripheral edge having an engagement aperture opened in a direction along the input surface. The pen is used for an input operation with respect to the input surface. The pen includes an insertion piece which is made of synthetic resin and is attachably and detachably engaged in the engagement aperture while the pen is arranged against to the peripheral edge. The antenna is disposed inside the peripheral edge to be adjacent to the insertion piece in a distance which is less than the size of the insertion piece in a transverse direction of the input surface.

Furthermore, according to one embodiment, a pen includes an electronic circuit for an input operation with respect to an electronic apparatus which accommodates an input device in a case, and the pen includes an insertion piece made of synthetic resin and being attachably and detachably engaged in an engagement aperture formed in a peripheral edge of the case in the direction along the input surface. The pen is, while the insertion piece is inserted into the engagement aperture, disposed such that the insertion piece becomes adjacent to an antenna disposed inside the case in the proximity of the engagement aperture with a distance to the insertion piece which is less than the size of the insertion piece in a transverse direction of the input surface.

Furthermore, according to one embodiment, a pen retention method is to detachably attach a pen to a case of an electronic apparatus, the pen, which is used for an input operation with respect to an input device accommodated in the case. In the method, the case has a peripheral edge which accommodates an antenna and is opened an engagement aperture in the direction along an input surface, the pen has an insertion piece made of synthetic resin on a side portion attachably and detachably engaged with the engagement aperture, the insertion piece having a size which is smaller than the engagement aperture along the axis of the pen and having a thickness elastically deformable in the transverse direction of the input surface to engage with the engagement aperture, and then the pen is fastened to the case by inserting the insertion piece into the engagement aperture in the direction crossing the peripheral edge along the input surface at a position where the insertion piece is adjacent to the antenna in a distance which is less than the thickness of the insertion piece.

Figure 1:
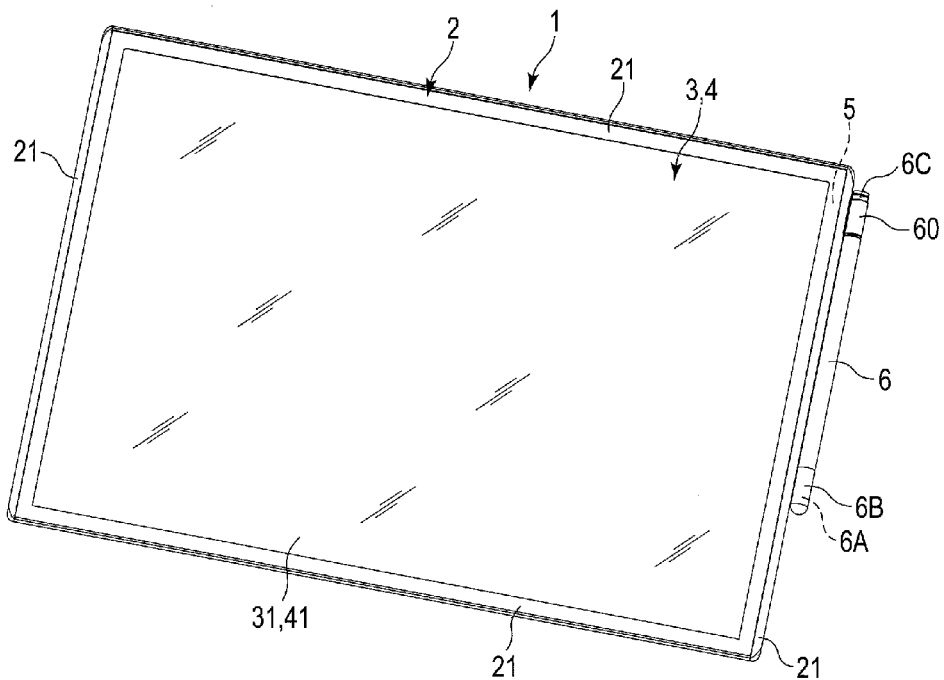
FIG. 1 is a perspective view which shows a pen attached to an electronic apparatus of a first embodiment.

An electronic apparatus 1 of a first embodiment will be described with reference to FIGS. 1 to 4. FIG. 1 shows the electronic apparatus 1 which is a tablet portable computer including, in a quadrangular flat panel case 2, a display unit 3, touch-type input device 4, circuit board, battery, and communication antenna 5. A display 31 of the display unit 3 is provided with one surface of the case 2.

The input device 4 is layered on the display unit 3 and can accept an input operation made by a user with a finger touch on the surface of the case 2 at the display 31 side or with a specific pen 6. That is, the external surface of the case 2 facing the display 31 is an input surface 41. The electronic apparatus 1 of the present embodiment includes a touch screen as an input device 4 and the specific pen 6 which enables a fine input operation is used. Here, a touch screen as the input device 4 is not limited to currently-known touch screens such as a pressure-sensitive touch screen, a capacitive touch screen, and a digitizer, but can be any type of touch screen which can accept an input operation on an input surface by a pen 6.

The antenna 5 is configured to correspond to a frequency band used for wireless communication with a peripheral device and the Internet, and is disposed along a peripheral edge 21 of the case 2. Note that, for the sake of simplification of the explanation, the display side which accepts an input operation may be referred to as a front surface, and the opposite side may be referred to as a rear surface. Furthermore, if the display is raised up vertically, the upper side may be referred to as the top, the lower side may be referred to as the bottom, and the right and left sides may be referred to as sides.

Figure 2:
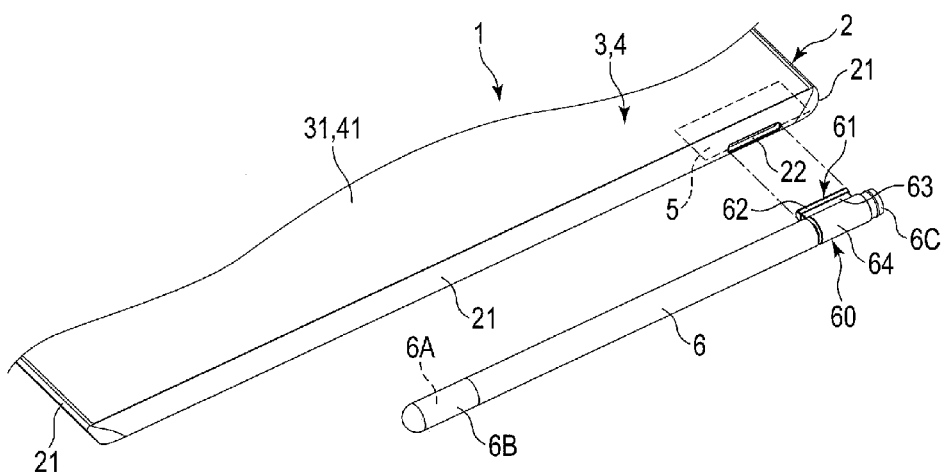
FIG. 2 is a perspective view which shows the pen and the electronic apparatus of FIG. 1 in a disassembled manner.

The pen 6 may be a stylus and includes an electronic circuit, battery, coil, and the like inside a case thereof, and produces a field at a pen tip 6A for the input operation with respect to the input surface 41 of the electronic apparatus 1 that accommodates the touch screen. When not in use, the pen 6 is retained along a side of the peripheral edge 21 of the case 2 of the electronic apparatus 1 with a cap 6B attached to the pen tip 6A. FIG. 1 shows an example where the electronic apparatus 1 is used with the display 31 laid in a horizontal orientation, and the pen 6 is retained at the right side. As shown in FIG. 2, the case 2 has an engagement aperture 22 opened in the peripheral edge 21 in a direction along the input surface 41. The engagement aperture 22 is in the form of an elongate slot along the peripheral edge 21. The pen 6 includes an insertion piece 61 made of synthetic resin which can be attachably and detachably engaged in the engagement aperture 22 while the pen 6 is arranged against to the peripheral edge 21 of the case 2. The pen 6 is thus easily fastened by inserting the insertion piece 61 into the engagement aperture 22 along the input surface 41.

Figure 3:
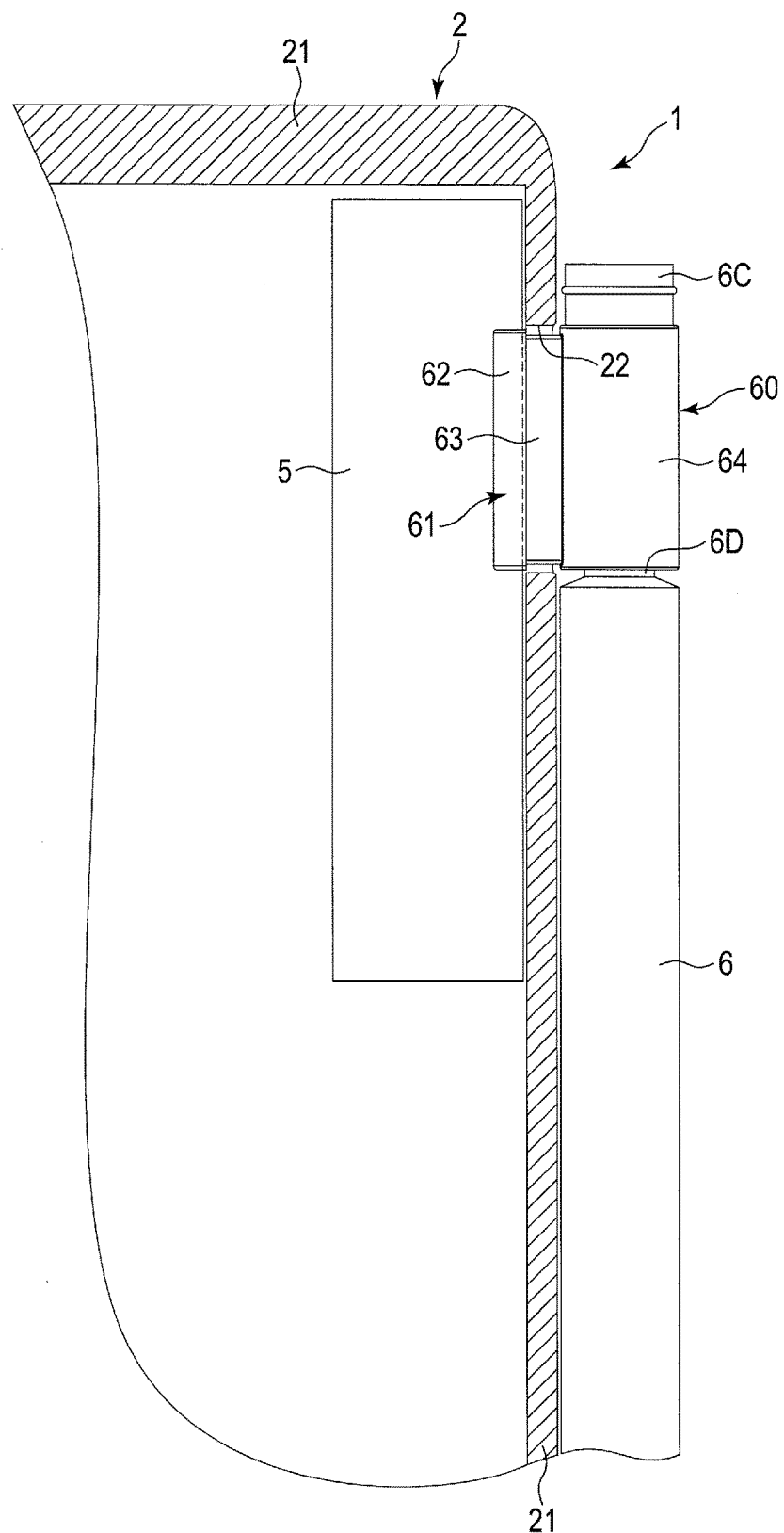
FIG. 3 is a cross-sectional view which shows the electronic apparatus and pen.

FIG. 3 is a cross-sectional view which shows the case 2 taken a parallel plane with respect to the input surface 41 while the insertion piece 61 of the pen 6 is engaged in the engagement aperture 22 of the case 2. FIG. 4 is a cross-sectional view which shows the engagement aperture 22 and the insertion piece 61 taken vertically with respect to the central axis of the pen 6 while the insertion piece 61 is engaged in the engagement aperture 22. The engagement aperture 22 and the insertion piece 61 each have a length greater than a width of the pen 6 along the peripheral edge 21. Furthermore, the insertion piece 61 has a tip 62 which is larger than the opening of the engagement aperture 22 in the transverse direction of the input surface 41 and has a body 63 which is smaller than the opening of the engagement aperture 22 in the direction along the peripheral edge 21. Furthermore, the body 63 is formed to have substantially the same size as the opening of the engagement aperture 22 in the transverse direction of the input surface 41.

In the present embodiment, the insertion piece 61 is, as shown in FIGS. 2 and 3, provided integrally with a fastener 60 which is externally attached to the end 6C opposite to the pen tip 6A. The fastener 60 has a hoop-like proximal portion 64 the external diameter of which is the same as the diameter of the body of the pen 6. Thus, the proximal portion 64 is engaged with a constriction 6D of the end 6C of the pen 6. The insertion piece 61 extends radially relative to the axis of the pen 6 from the proximal portion 64. With the insertion piece 61 having such a shape, the pen 6 can be retained along the peripheral edge 21 with less instability in an arc around the insertion direction of the insertion piece 61.

The antenna 5 is disposed inside the peripheral edge 21 of the case 2 in the proximity of the engagement aperture 22 to be adjacent to the insertion piece 61 at a position less than the size of the insertion piece 61 in the transverse direction of the input surface 41. In this embodiment, as shown in FIGS. 3 and 4, the antenna 5 is patterned on a film-like substrate and is disposed to at least partly overlap the insertion piece 61 in the transverse direction of the input surface 41. Note that, as long as the antenna 5 fits in a position less than the size of the insertion piece 61 in the transverse direction of the input surface 41, the antenna may be arranged next to the insertion piece 61 in the direction along the peripheral edge 21 instead of the direction overlapping the insertion piece 61 as in FIGS. 3 and 4.

As can be understood from the above, the pen 6 is used for the input operation with respect to the input surface 41 of the electronic apparatus 1 which accommodates a touch screen as the input device 4 in the case 2, and if the pen 6 is not used, it is attached to the case 2. In the present embodiment, the engagement aperture 22 is opened in the peripheral edge 21 of the case 2 which accommodates the antenna 5 in the direction along the input surface 41, and the insertion piece 61 which is made of synthetic resin and may be attachably and detachably engaged in the engagement aperture 22 is provided with a side of the pen 6. The insertion piece 61 has a size which is smaller than the engagement aperture 22 in the direction along the axis of the pen 6 and has thickness suitable for elastic deformation to be engaged in the engagement aperture 22 in the transverse direction of the input surface 41. By inserting the insertion piece 61 into the engagement aperture 22 in a direction crossing the peripheral edge 21 along the input surface 41 at a position where the insertion piece 61 is adjacent, to the antenna 5 in the distance which is less than the thickness of the insertion piece 61, the pen 6 may be detachably attached to the case 2.

The insertion piece 61 is formed of a synthetic resin, and thus, even if the insertion piece 61 is disposed in the proximity of the antenna 5, it does not affect the performance of the antenna 5. That is, there is no need of disposing the antenna 5 to be distant from the engagement aperture 22 in which the insertion piece 61 is inserted, and thus, the internal space of the case 2 can be used sufficiently.

Now, the electronic apparatuses 1 of each of the second to fifth embodiments will be explained. In each embodiment, if the same structure and function of the electronic apparatus 1 of the first embodiment are adopted, the same reference numbers are added thereto and the detailed explanation will be supported by the description and figures of the first embodiment.

The electronic apparatus 1 of the second embodiment will be explained with reference to FIG. 5. FIG. 5 is a cross-sectional view of the engagement aperture 22 and the insertion piece 61 and their periphery taken perpendicular to the central axis of the pen 6 in a state where the pen 6 is retained on the case 2 by inserting the insertion piece 61 of the pen 6 in the engagement aperture 22 provided with the peripheral edge 21 of the electronic apparatus 1. As shown in FIG. 5, the antenna 5 extends curving along the internal surface of the peripheral edge 21 of the case 2 and has a through-hole 51 through which the insertion piece 61 introduced inside the case 2 is passed. The antenna 5 is patterned around the through-hole 51. A notch may be acceptable instead of the through-hole 51. The other structure is the same as the electronic apparatus 1 of the first embodiment.

In the electronic apparatus 1 of the second embodiment structured as above, the insertion piece 61 of the pen 6 can be disposed to overlap the area where the antenna 5 is mounted. When the antenna 5 is disposed inside the case, it needs to be arranged with a certain distance from its peripheral parts including conductive materials and the packaging efficiency of the case 2 is decreased. The insertion piece 61 of the pen 6 of the present embodiment is, however, formed of a synthetic resin and the position thereof is not restricted even in the proximity of the antenna 5. Therefore, if the antenna 5 has a room on the pattern, the packaging efficiency of the case 2 can be improved by arranging the antenna 5 so that the room matches to the engagement aperture 22.

Figure 6:
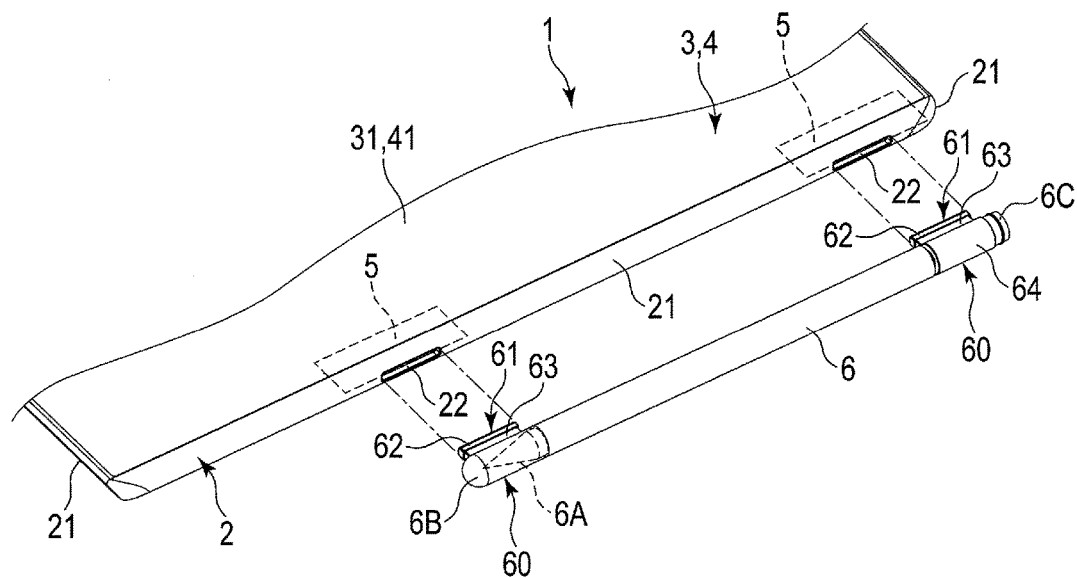
FIG. 6 is a perspective view which shows a pen and electronic apparatus of a third embodiment in a disassembled manner.

The electronic apparatus 1 of the third embodiment will be described with reference to FIG. 6. FIG. 6 is a perspective view which shows the pen 6 detached from the case 2 of the electronic apparatus 1 in a disassembled manner. The case 2 of the electronic apparatus 1 has engagement apertures 22 at several separated positions along the peripheral edge 21. The pen 6 includes several insertion pieces 61 separated to correspond to the positions of the engagement apertures 22. In this embodiment, the electronic apparatus 1 has two engagement apertures 22, and the pen 6 has two corresponding insertion pieces 61. The pen 6 includes the pen tip 6A contacting the input surface 41 during the input operation and the cap 63 used for the protection of the pen tip 6A. One of the insertion piece 61 is provided with an end 6C opposite to the pen tip 6A and the other insertion piece 61 is provided with the cap 6B. Therefore, the insertion pieces 61 are provided with the both ends of the pen 6.

In the electronic apparatus 1 of the third embodiment structured as above, the insertion pieces 61 of the pen 6 are engaged in the two engagement apertures 22 of the case 2, and thus, the pen 6 can be fastened securely to the case 2 even when the electronic apparatus 1 is carried with the pen 6 attached to the case 2.

Figure 7:
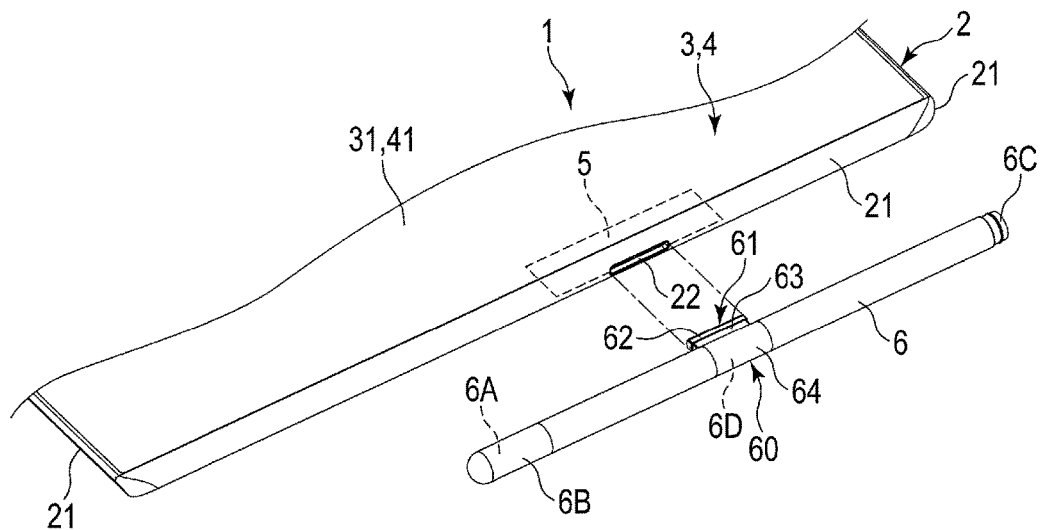
FIG. 7 is a perspective view which shows a pen and electronic apparatus of a fourth embodiment in a disassembled manner.

The electronic apparatus 1 of the fourth embodiment will be explained with reference to FIG. 7. FIG. 7 is a perspective view which shows the pen 6 detached from the case 2 of the electronic apparatus 1 in a disassembled manner. In the electronic apparatus 1 of FIG. 7, the insertion piece 61 is arranged to be at substantially the center of the pen 6 in its axis. As in the other embodiments, the insertion piece 61 projects in the radial direction from the axis of the pen 6. When a user holds the pen 6, a projection within the central area of the axis of the pen 6 will not bother the user. Therefore, in this embodiment, the engagement aperture 22 is provided with substantially the center of the case 2 such that the cap 6B or the end 6C of the pen 6 can be maintained within the peripheral edge 21.

The antenna 5 is arranged to go along the internal surface of the peripheral edge 21 of the case 2 where the engagement aperture 22 is formed. The antenna 5 may be arranged as in the first embodiment to overlap the insertion piece 61 which is engaged in the engagement aperture 22 in the transverse direction of the input surface 41, or the antenna 5 may be arranged as in the second embodiment to have a through-hole 51 through which the insertion piece 61 is inserted to be engaged in the engagement aperture 22.

In the electronic apparatus 1 of the fourth embodiment structured as above, the pen 6 with the insertion piece 61 provided with the center thereof can be attached to the case 2 regardless of the orientation of the pen tip 6A along the peripheral edge 21. Furthermore, since a gap between the insertion piece 61 and the cap 6B or the end 6C is short, the pen 6 can be attached to the case 2 more stably when the electronic apparatus 1 is carried by user.

Figure 8:
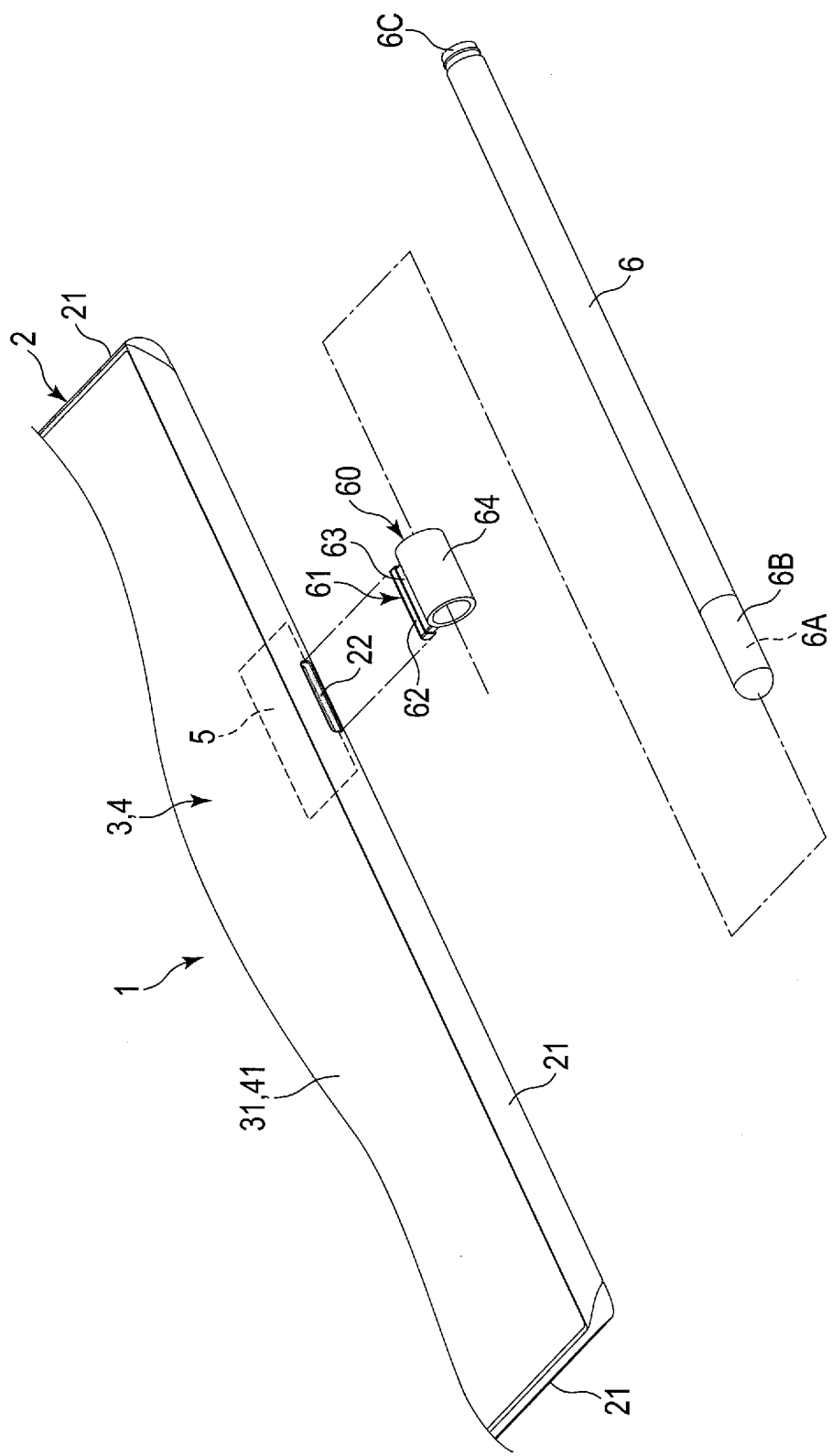
FIG. 8 is a perspective view which shows a pen, fastener, and electronic apparatus of a fifth embodiment in a disassembled manner.

The electronic apparatus 1 of the fifth embodiment will be explained with reference to FIG. 8. In the electronic apparatus 1 of the present embodiment, the pen 6 includes a detachable fastener 60, and the insertion piece 61 is provided integrally with the fastener 60. FIG. 8 is a perspective view which shows the pen 6 detached from the case 2 of the electronic apparatus 1 and from the fastener 60 in a disassemble manner. The fastener 60 has a hoop-like proximal portion 64 having an internal diameter which is slightly smaller than the diameter of the shaft of the pen 6. The proximal portion 64 is formed of a synthetic resin material to continue the insertion piece 61, and has suitable elasticity for fitting the body of the pen 6.

In the electronic apparatus 1 of the fifth embodiment structured as above, the insertion piece 61 can be arranged as in the fourth embodiment to correspond to the center of the pen 6, and the position of the insertion piece 61 can be moved along the axis of the pen 6. The position of the pen 6 can be adjusted with respect to the case 2. Furthermore, the pen 6 can be replaced with another item.

Note that the electronic apparatus 1 is not limited to a tablet-type portable computer, and may be, for example, an extra-feature touch screen which is externally connected to data processors such as desktop, notebook, and tablet computers via cable or wireless connection.

Furthermore, the retention position of the pen 6 on the case 2 of the electronic apparatus 1 can be changed to any side of the peripheral edge 21, and engagement apertures 22 may be provided with multiple sides of the peripheral edge 21 of the case 2 such that the retention position of the pen 6 can be changed to correspond to a use condition of the electronic apparatus 1. Furthermore, if the pen 6 is retained at the end 6C which is opposite to the pen tip 6A as in the first embodiment, the case 2 and the pen 6 may be caused to adhere to each other by permanent magnets or the like contained therein such that the pen tip 6A does not wobble during operation or carriage of the electronic apparatus 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a case including an input surface and a peripheral edge having an engagement aperture opened in a direction along the input surface;
    a pen which is used for an input operation with respect to the input surface, the pen including an insertion piece which is made of synthetic resin and is attachably and detachably engaged in the engagement aperture while the pen is arranged along the peripheral edge; and
    an antenna disposed inside the peripheral edge to be adjacent to the insertion piece in a distance which is less than a size of the insertion piece in a transverse direction of the input surface, wherein
    the insertion piece comprises a body which extends from a proximal portion of a fastener attached to a body of the pen and which is smaller than a size of an opening of the engagement aperture in a direction along the peripheral edge, and a tip which is joined to the body of the insertion piece and which is larger than a size of an opening of the engagement aperture in the transverse direction of the input surface, and wherein the antenna comprises a through-hole which passes the insertion piece extending inside the case through the engagement aperture.

2. A pen retention method for detachably attaching a pen to a case of an electronic apparatus accommodating an input device, the pen including an electronic circuit for an input operation to the electronic apparatus, wherein the case comprises a peripheral edge which accommodates an antenna in and which has an engagement aperture opened in a direction along an input surface, and the pen includes an insertion piece made of synthetic resin at a side thereof, the insertion piece attachably and detachably engaged in the engagement aperture, and having a thickness elastically deformable in a direction along an axis of the pen and in a transverse direction of the input surface to engage in the engagement aperture, and the antenna comprises a through-hole which passes the insertion piece extending inside the case through the engagement aperture, the method comprising:

fastening the pen to the case by inserting a tip of the insertion piece into the engagement aperture in a transverse direction of the peripheral edge along the input surface at a position where the insertion piece is adjacent to the antenna in a distance which is less than a thickness of the insertion piece.

* * * * *